US012654818B2

(12) United States Patent
Köhnsen

(10) Patent No.: US 12,654,818 B2
(45) Date of Patent: Jun. 16, 2026

(54) HYDROFOIL DEVICE AND PIECE OF WATER SPORTS EQUIPMENT

(71) Applicant: Jetworx GmbH, Norderstedt (DE)

(72) Inventor: Jennifer Köhnsen, Hamburg (DE)

(73) Assignee: Jetworx GmbH, Norderstedt (DE)

( * ) Notice: Subject to any disclaimer, the term of this patent is extended or adjusted under 35 U.S.C. 154(b) by 433 days.

(21) Appl. No.: 18/488,138

(22) Filed: Oct. 17, 2023

(65) Prior Publication Data

US 2024/0124102 A1     Apr. 18, 2024

(30) Foreign Application Priority Data

Oct. 18, 2022     (DE) ..................... 10 2022 127 226.5

(51) Int. Cl.
| | |
|---|---|
| *B63B 32/60* | (2020.01) |
| *B63B 32/10* | (2020.01) |
| *B63H 21/17* | (2006.01) |
| *B63H 21/21* | (2006.01) |
| *H01M 10/613* | (2014.01) |
| *H01M 10/625* | (2014.01) |
| *H01M 10/6556* | (2014.01) |
| *H01M 50/249* | (2021.01) |

(52) U.S. Cl.
CPC .............. *B63B 32/60* (2020.02); *B63B 32/10* (2020.02); *B63H 21/17* (2013.01); *B63H 21/213* (2013.01); *H01M 10/613* (2015.04); *H01M 10/625* (2015.04); *H01M 10/6556* (2015.04); *H01M 50/249* (2021.01); *H01M 2220/20* (2013.01)

(58) Field of Classification Search
CPC .......... B63B 32/60; B63B 32/10; B63B 1/30; B63B 1/246; B63B 32/66; B63B 32/64; B63B 32/62; B63H 21/17
See application file for complete search history.

(56) References Cited

U.S. PATENT DOCUMENTS

| | | | | |
|---|---|---|---|---|
| 10,556,151 | B1* | 2/2020 | Malykhin | ............... B63B 32/20 |
| 2001/0042498 | A1* | 11/2001 | Burnham | ............... B63B 32/10 |
| | | | | 114/55.56 |
| 2015/0104985 | A1 | 4/2015 | Langelaan | |
| 2018/0072383 | A1* | 3/2018 | Montague | ............... B63B 32/64 |
| 2022/0063786 | A1 | 3/2022 | Montague et al. | |
| 2022/0315174 | A1* | 10/2022 | Sewell | ..................... B63B 1/248 |
| 2024/0253746 | A1* | 8/2024 | Tian | ......................... B63B 32/77 |

FOREIGN PATENT DOCUMENTS

| | | | | |
|---|---|---|---|---|
| CA | 3208395 | A1 | 8/2022 | |
| IT | 202000002569 | A1 | 8/2021 | |
| WO | WO-2025241009 | A1* | 11/2025 | ............. B63B 32/10 |

* cited by examiner

*Primary Examiner* — Andrew Polay

(74) *Attorney, Agent, or Firm* — Rankin, Hill & Clark LLP

(57)     ABSTRACT

A hydrofoil device (3) and to a piece of water sports equipment (2). The hydrofoil device (3) includes at least one foil (6, 7), a support column (4), an electric drive (8), and at least one battery (9). A head end (5) of the support column (4) is configured to be secured to an underside (14) of a hull (10) of the piece of water sports equipment (2). An elongate signal cable duct (20) extends from a rear end (21), arranged at the support column (4), to a front end (22), which includes a receiving device (23). The receiving device (23) is configured to receive control signals. The signal cable duct (20) encloses a signal cable (24), which transmits the control signals from the receiving device (23) to the electric drive (8). The signal cable duct (20) is further configured to grip around a front edge (16) of the hull.

21 Claims, 3 Drawing Sheets

7

HYDROFOIL DEVICE AND PIECE OF WATER SPORTS EQUIPMENT

PRIORITY CLAIM

This application claims priority to DE 10 2022 127 226.5, filed Oct. 18, 2022, which is hereby incorporated by reference in its entirety.

BACKGROUND OF INVENTION

Field of Invention

The invention relates to a hydrofoil device, comprising at least one foil, a support column, an electric drive, and at least one battery, wherein a head end of the support column is designed to be secured to an underside of a hull of a piece of water sports equipment, wherein the at least one foil is secured to the support column, wherein the electric drive is secured to the support column and/or foil, wherein the at least one battery is electrically connected to the electric drive and supplies the electric drive with electrical energy. Furthermore, the invention relates to a piece of water sports equipment comprising a hull and a hydrofoil device of this kind.

Brief Description of Related Art

A hydrofoil, which is also called a fin or foil, is attached below the hull of a piece of water sports equipment in order to raise the water vehicle out of the water at increasing speeds, such that the hull is no longer in contact with the water. In addition to larger water vehicles, for example hydrofoil boats, hydrofoils are increasingly also used on water sports equipment, for example electrically driven surfboards or kitesurfing boards.

An electrically driven surfboard of this kind having a hydrofoil allows a user lying or standing on the board to be raised out of the water by means of the electric drive such that high speeds can be reached on account of the reduced resistance.

However, the flexibility of such water sports equipment is often limited. Due to the additional weight of the hydrofoil, including the drive and batteries, a piece of water sports equipment of this kind is heavier than surfboards without a hydrofoil and drive. This renders use of the piece of water sports equipment difficult for applications in which the electric drive is not required. In addition, the procurement of water sports equipment with a driven hydrofoil is cost-intensive. The costs of the hydrofoil, electric drive and battery add up, especially when different water sports equipment are used, for example surfboards of different lengths and widths.

BRIEF SUMMARY OF THE INVENTION

The object of the present invention is to specify a hydrofoil device and a piece of water sports equipment which achieve a high flexibility of use and which are cost-effective.

This object is solved by a hydrofoil device, comprising at least one foil, a support column, an electric drive, and at least one battery, wherein a head end of the support column is designed to be secured to an underside of a hull of a piece of water sports equipment, wherein the at least one foil is secured to the support column, wherein the electric drive is secured to the support column and/or foil, wherein the at least one battery is electrically connected to the electric drive and supplies the electric drive with electrical energy, wherein the hydrofoil device is further developed in that the hydrofoil device further comprises an elongate signal cable duct, wherein a rear end of the signal cable duct is arranged at the support column and a front end of the signal cable duct comprises a receiving device, wherein the receiving device is designed to receive control signals, wherein the signal cable duct encloses at least one signal cable, wherein the signal cable is designed to transmit the control signals from the receiving device to the electric drive, wherein the signal cable duct is designed to grip around a front edge of the hull of the piece of water sports equipment.

The hydrofoil device can advantageously be used very flexibly on account of the elongate signal cable duct. The hydrofoil device is designed as a removable piece of additional equipment and can be secured to and removed from a piece of water sports equipment again at any time. For this purpose, the head end of the support column is simply secured to the underside of the hull of the piece of water sports equipment and the signal cable duct is attached to the piece of water sports equipment such that it grips around the front edge of the hull. The signal cable duct is designed, in particular, to be attached to the underside of the piece of water sports equipment. In particular, said signal cable duct extends from the head end of the support column along the underside of the hull toward the bow of the piece of water sports equipment, where the front end of the signal cable duct grips around the front edge of the hull. In this way, the receiving device, which is located at the front end of the signal cable duct, is arranged in the bow region of the piece of water sports equipment.

The receiving device is, in particular, designed to wirelessly receive the control signals. On account of the wireless transmission, additional cables that could impede a user during travel can be avoided on the upper side of the hull. The hydrofoil device comprises, in particular, a remote control device which is designed to transmit control signals wirelessly to the receiving device. For example, a user of the hydrofoil device or rather of the piece of water sports equipment holds the remote control device in their hand while lying or standing on the hull. In this way, the piece of water sports equipment can be controlled in a simple manner. By means of the control signals, in particular the electric drive is switched on and off and/or a speed is set and/or a direction of travel is changed, for example by means of a rudder of the electric drive.

The signal cable duct thus produces a high degree of flexibility in that it makes it possible to secure the hydrofoil device to different pieces of water sports equipment while also making it possible to reliably actuate the drive via the receiving device arranged at the bow. In addition to increased flexibility, this also leads to cost savings, since, for example, a user with many different surfboards merely requires one hydrofoil device that can be secured to all surfboards. A hydrofoil device of this kind is also extremely advantageous for those who rent out water sports equipment, since the procurement costs for the hydrofoil, the electric drive, and the batteries are reduced. In addition, fewer resources are needed and the environment is spared, since the number of hydrofoils, drives, and batteries to be manufactured can be reduced.

The support column of the hydrofoil device is also referred to as a mast, strut, or spar. It generally extends perpendicularly from the underside of the hull downward when the hydrofoil device is fastened to the hull. In this way, the at least one foil is held at a vertical distance from the hull.

The signal cable duct is, in particular, designed to be watertight. This prevents the signal cable from becoming corroded or damaged in another way by water.

Preferably, the signal cable duct is designed such that the receiving device is arranged on an upper side of the hull at a bow of the piece of water sports equipment when the front end of the signal cable duct grips around the front edge of the hull. The bow-side region of the upper side of the hull is particularly well suited for accommodating the receiving device, since this region lies above water during travel with the piece of water sports equipment and water does not wash over it. This ensures interference-free transmission of the control signals from the remote control device to the receiving device.

The signal cable duct is preferably designed to be resilient in a longitudinal direction, wherein the signal cable duct in particular consists of rubber or comprises rubber.

The resilient design of the signal cable duct is advantageous, since, in this way, the hydrofoil device can be fastened to hulls of different lengths without any problems. In the case of a longer hull, the signal cable duct is stretched to a greater extent than in the case of a shorter hull. However, in both cases, the front end of the signal cable duct adjoins the front edge of the hull and grips around same in order to thus hold the signal cable duct securely against the hull. The at least one signal cable is, in particular, also designed to be resilient in the longitudinal direction. In the present description, the longitudinal direction is defined as the direction in which the signal cable duct extends. If the hydrofoil device is secured to the piece of water sports equipment, the longitudinal direction substantially corresponds to the direction from the stern to the bow of the piece of water sports equipment, or vice versa.

Preferably, the signal cable duct is designed as a flat strip. A design as a flat strip is advantageous, since the signal cable duct can thus lie securely against the underside of the hull without slipping. The signal cable duct and the at least one signal cable are designed, in particular, as ribbon cables.

Preferably, the front end of the signal cable duct comprises at least one bending edge which extends transversely to the longitudinal direction and by means of which a clamp is formed for gripping around the front edge of the hull.

On account of the bending edge, the front end of the signal cable duct can securely grip around the front edge of the hull. In particular, the front end comprises at least two bending edges. This is achieved in that a first part of the signal cable duct lies against the underside, a second part lies against the front edge of the hull, and a third part lies against the upper side of the hull, thus forming the clamp. According to one embodiment, the signal cable duct comprises more than two bending edges in order to be able to adapt the clamp to different hull thicknesses and hull lengths. In particular, the clamp is designed to be resilient. On account of the resilient design of the clamp, the flexibility is increased when the front end of the signal cable duct is secured to water sports equipment.

Preferably, the front end of the signal cable duct comprises a retainer which is designed to be secured to the upper side of the hull. By means of the retainer, the signal cable duct is secured even more securely to the hull. In particular, the retainer comprises a locking element which cooperates with a counterpiece at the bow on the upper side of the hull. In this way, the signal cable duct can be releasably fastened to the hull in a simple manner. For example, the retainer is a latch or projection which engages in a complementary recess on the upper side of the hull. According to another exemplary embodiment, the bow forms a bulge behind which the retainer securely clamps.

According to one embodiment, the signal cable duct encloses an emergency stop cable in addition to the at least one signal cable, wherein the emergency stop cable is designed, in particular, to transmit an emergency stop signal from a reed switch to the electric drive, wherein the hydrofoil device further comprises, in particular, a magnet which is coupled to a tether and which can be releasably secured to the reed switch, wherein the reed switch is in particular designed to be secured to the piece of water sports equipment and to generate the emergency stop signal if the magnet is removed from the reed switch.

The tether is in particular designed to be fastened to a wrist of a user. Provided that the magnet is secured to the reed switch, the piece of water sports equipment is ready to ride. If the user falls off of the piece of water sports equipment, they pull the tether and thus the magnets with it and thus remove the magnet from the reed switch. In this way, the emergency stop signal is generated and the electric drive stops.

According to one embodiment, the magnet and the tether are secured to the remote control device. The remote control device is therefore fastened, for example, to the wrist of the user by means of the tether. In particular, the piece of water sports equipment comprises a handle with a recess into which the remote control device can be inserted. The reed switch is in particular secured to the handle. Provided that the remote control device has been inserted into the recess, the piece of water sports equipment is ready to ride. If the remote control device is pulled out, the piece of water sports equipment stops.

According to another embodiment, the magnet is secured directly to the tether. In this embodiment, the reed switch is in particular arranged on the upper side of the piece of water sports equipment. If the user falls off of the piece of water sports equipment, they pull the magnets off of the reed switch and the piece of water sports equipment stops.

According to another embodiment, the piece of water sports equipment comprises a handle that is secured, in particular rigidly, to the hull. The handle in particular comprises an operating element which is designed to generate the control signals and to regulate the power of the drive. The operating element is in particular a deflectable operating element, for example a throttle. The deflection of the deflectable operating element is detected, in particular, by means of a Hall sensor that is secured, in particular, to the tether. If the tether is pulled away when the user falls off, the Hall sensor no longer detects the deflection of the deflectable operating element, such that the drive is no longer actuated and stops. In this way, redundancy is achieved when generating the emergency stop in the event of a fall from the piece of water sports equipment, since the reed switch generates an emergency stop signal and the Hall sensor no longer actuates the electric drive.

Preferably, the head end of the support column comprises an adapter by means of which the hydrofoil device can be secured to the underside of the piece of water sports equipment, wherein the adapter in particular comprises four bores.

The adapter makes it possible to secure the hydrofoil device to a wide variety of water sports equipment. In particular, the adapter has a standardized hole spacing. By means of the bores, the hydrofoil device is securely screwed, for example, to the hull of the piece of water sports equipment.

The electric drive is preferably an impeller or a jet drive. On account of the design of the electric drive as an impeller or jet drive, a high level of safety is ensured. For example, it is prevented that a user is injured on a free-running propeller.

According to one embodiment, the at least one battery comprises an integrated battery that is arranged in the support column.

On account of the arrangement of the battery in the support column, there is sufficient installation space for the battery without the battery having to be designed as a component that is separate from the other components of the hydrofoil device. If the hydrofoil device is transferred from one piece of water sports equipment to another piece of water sports equipment, the battery advantageously does not have to be retrofitted separately.

Preferably, the support column comprises a cavity for accommodating a coolant, wherein the integrated battery is arranged in the support column such that it is at least partially surrounded by the coolant. The coolant may, for example, be an e-Fluid from the company Castrol. According to one embodiment, a material of the support column conducts heat. In this way, the heat of the battery can be effectively dissipated by means of the coolant.

According to one embodiment, the at least one battery comprises an integrated battery that is arranged in the at least one foil. On account of the arrangement of the battery in the foil, a particularly compact design is achieved.

Preferably, the at least one foil comprises a front foil, wherein the integrated battery is arranged in the front foil, wherein the electric drive is secured to the front foil such that the front foil forms a structural unit together with the integrated battery and the electric drive. Advantageously, on account of the design of the front foil as a structural unit together with the integrated battery and the electric drive, an embodiment of the hydrofoil device that is particularly easy to transport is made available. In particular, the structural unit is releasably secured to the support column in order to simplify transportation. According to an exemplary embodiment, one battery is integrated in each case in a left-hand part and in a right-hand part of the front foil. The batteries here are, for example, lithium polymer batteries with a capacity in each case of 160 Wh and/or dimensions of 300.0 mm length, 42.0 mm width, and 44.0 mm height. Batteries of this power and size are well suited for being housed in a support column and still provide enough power to drive the hydrofoil device and the piece of water sports equipment.

Preferably, the at least one foil comprises at least one foldable foil, wherein the at least one foldable foil can be pivoted from a position lying against the support column into a position oriented orthogonally to the support column.

On account of the design as a foldable foil, transportation of the hydrofoil device is simplified further. During use of the hydrofoil device, the foils are oriented orthogonally to the support column as with other hydrofoils, but they can be placed against the support column in order to simplify transportation.

The object is also achieved by means of a piece of water sports equipment or a water sports apparatus, comprising a hull and a hydrofoil device according to any one of the above-described embodiments, wherein the head end of the support column of the hydrofoil device is secured to an underside of the hull, wherein the front end of the signal cable duct grips around the front edge of the hull.

The piece of water sports equipment or the water sports apparatus embodies the same advantages, features, and properties of the hydrofoil device described above.

The piece of water sports equipment is, in particular, a surfboard, a canoe, a tender boat, or a dive scooter.

Preferably, the signal cable duct is guided proceeding from the support column along the underside of the hull to the front edge of the hull. In this way, secure abutment of the signal cable duct against the hull is achieved.

Further features of the invention will become evident from the description of embodiments according to the invention, together with the claims and the appended drawings. Embodiments according to the invention can fulfill individual features or a combination of multiple features.

Within the framework of the invention features which are labeled with "in particular" or "preferably" are to be understood to be optional features.

BRIEF DESCRIPTION OF THE DRAWINGS

The invention will be described below without restricting the general concept of the invention by means of exemplary embodiments with reference to the drawings, wherein reference is expressly made to the drawings regarding all of the details according to the invention which are not explained in greater detail in the text, wherein.

In the drawings, the same or similar elements and/or parts are, in each case, provided with the same reference signs, and therefore they are not introduced again in each case.

DETAILED DESCRIPTION OF THE INVENTION

Figure 1:
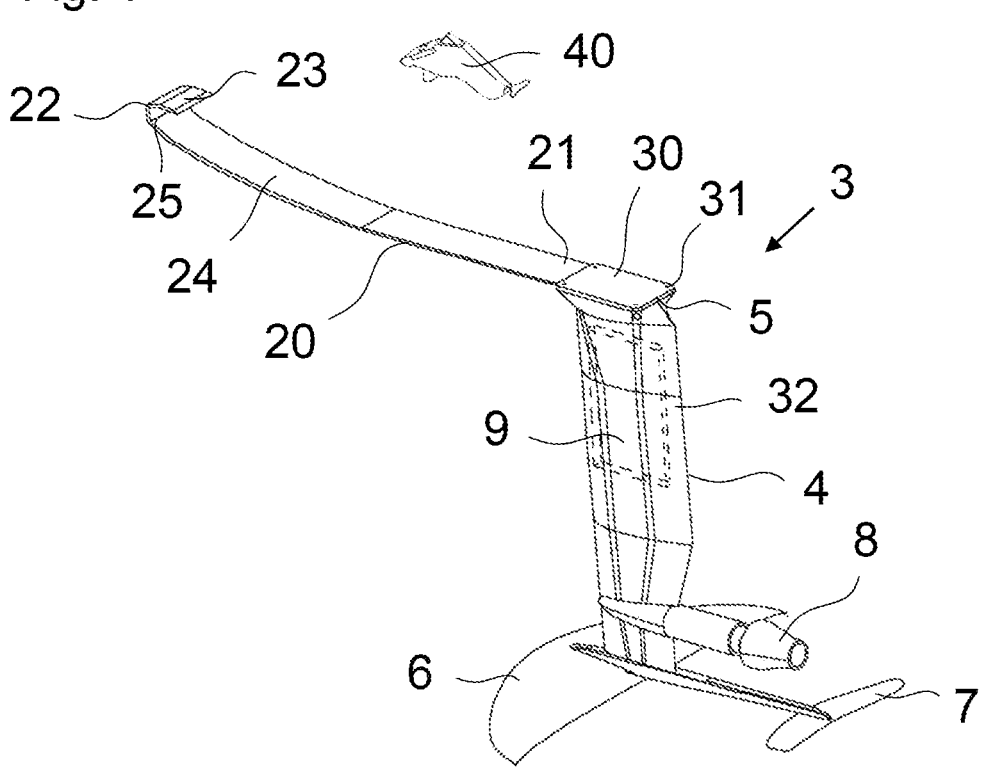
FIG. 1 is a schematic simplified perspective diagram of a hydrofoil device having an elongate signal cable duct.

FIG. 1 shows, in a schematically simplified manner, a hydrofoil device 3 in a perspective diagram. The hydrofoil device 3 comprises a front foil 6 and a rear foil 7, which are secured to a support column 4 directly or by means of a cantilever. An electric drive 8, which is designed as an impeller in the embodiment shown, is also integrated in the support column 4. A battery 9 integrated in the support column 4 supplies the electric drive 8 with electrical energy. The battery 9 is accommodated in a cavity 32, in which the battery 9 is at least partially surrounded by a coolant. Since the battery 9 in FIG. 1 is integrated in the support column 4 and would therefore not actually be visible, the battery 9 is represented by means of dashed lines. At its head end 5, the support column 4 comprises an adapter 30, in which four bores 31 have been made, of which only one has been provided with a reference sign for reasons of clarity. The head end 5 is secured, for example securely screwed, to a hull of a piece of water sports equipment by means of said adapter 30.

An elongate, resilient signal cable duct 20 extends from a rear end 21, which is arranged at the head end 5 of the support column 4, to a front end 22. One or more signal cables 24, which are arranged inside the signal cable duct 20 in FIG. 1 and are thus not visible, are guided in the signal cable duct 20. The signal cable 24 connects the electric drive 8 to a receiving device 23 arranged at the front end 22. The receiving device 23 is designed to wirelessly receive control signals, for example from a remote control device 40, which is held by a user in their hand. The control signals are forwarded from the receiving device 23 via the signal cable 24 to the electric drive 8 and make it possible to actuate the electric drive 8 by means of the remote control device 40. At the front end 22, the signal cable duct 20 comprises multiple bending edges 25, of which again only one has been provided with a reference sign for clarity. Said bending edges 25 can be used to shape the front end 22 into a clamp 27, by means of which the front end 22 can be secured to a front edge of the hull of the piece of water sports equipment.

Figure 2:
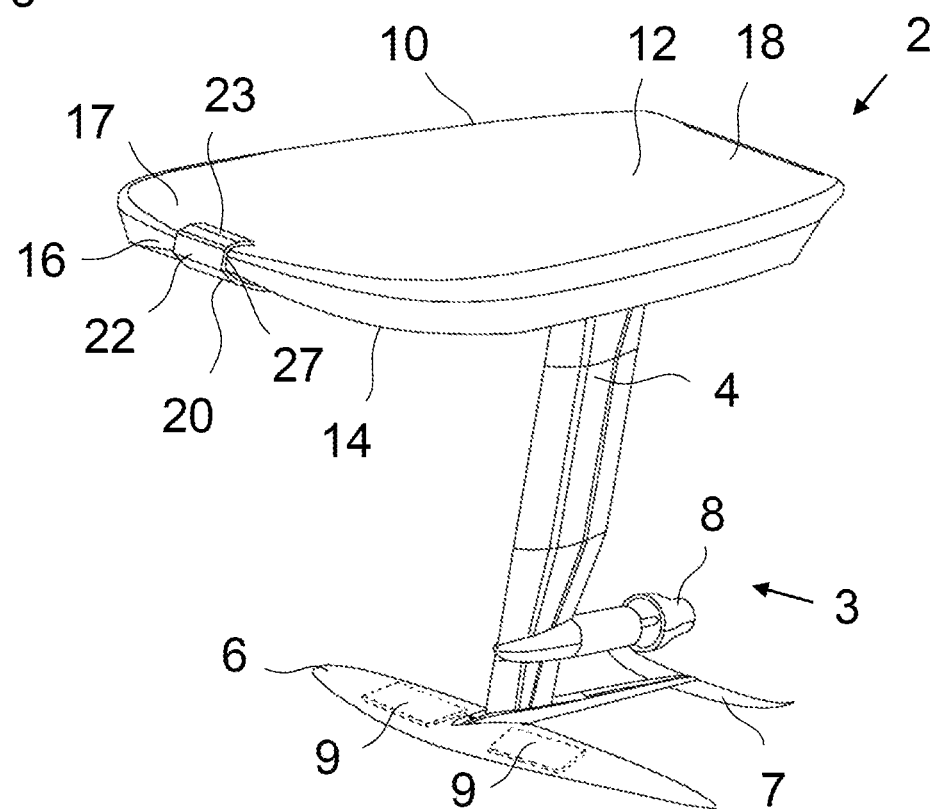
FIG. 2 is a schematic simplified perspective diagram of a hydrofoil device that is fastened to the hull of a piece of water sports equipment.

FIG. 2 shows, in a schematically simplified manner, a piece of water sports equipment 2 in the form of a surfboard by way of example, to the hull 10 of which the hydrofoil device 3 is secured. For this purpose, the head end 5 of the support column 4, which is concealed in FIG. 2, is secured to an underside 14 of the hull 10 by means of the adapter 30. At the same time, the front end 22 grips around the front edge 16 of the hull 10 in order to hold the signal cable duct 20 securely against the hull 10. This also allows for the receiving device 23 to be positioned on the upper side 12 of the hull 10 in the region of the bow 17 of the piece of water sports equipment 2. Such an arrangement of the receiving device 23 provides for interference-free transmission of control signals from the remote control device 40 to the receiving device 23 at any time during use of the piece of water sports equipment 2.

On account of the resilient design of the signal cable duct 20, same can be readily secured to water sports equipment 2 of different hull lengths. If the signal cable duct 20 is attached, for example, to a longer hull 10, said signal cable duct is pulled lengthwise in the longitudinal direction thereof and the front end 22 is placed against the front edge 16 of the hull. The longitudinal direction extends substantially from a stern 18 of the piece of water sports equipment 2 to the bow 17.

In contrast to the embodiment shown in FIG. 1, the hydrofoil device 3 in FIG. 2 comprises not one, but two batteries 9. Additionally, said batteries are not arranged in the support column 4, but rather in the front foil 6.

Figure 3:
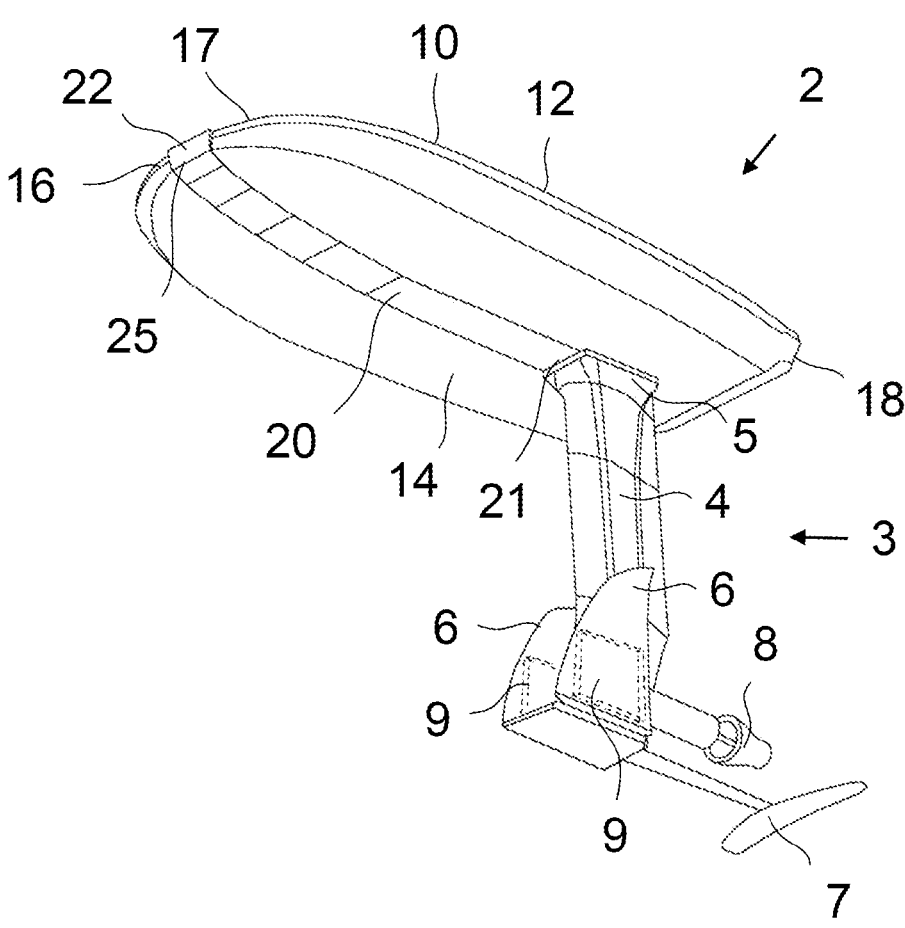
FIG. 3 is a schematic simplified perspective diagram of another embodiment of a hydrofoil device that is secured to a hull of a piece of water sports equipment.

FIG. 3 shows, in a schematically simplified manner, another embodiment of the hydrofoil device 2 in a schematically simplified diagram perspectively from below. This embodiment differs in that the fins of the front foil 6 are designed to be foldable. When the fins are folded up against the support column 4, as shown in FIG. 3, it is easier to transport the hydrofoil device 3. When the hydrofoil device 3 is being used, the fins are folded back into their horizontal position, such that they raise the piece of water sports equipment 2 out of the water during use.

Figure 4:
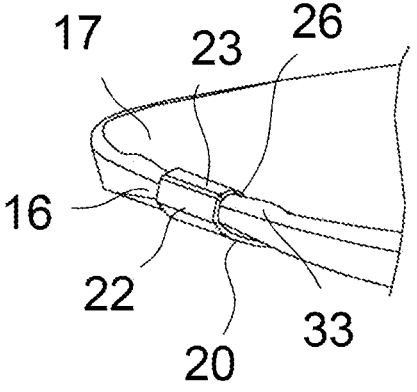
FIG. 4 is a schematic simplified perspective diagram of the signal cable duct of a hydrofoil device that is secured to the bow of a piece of water sports equipment by means of a retainer.

FIG. 4 shows, in a schematically simplified manner, a bow portion of a piece of water sports equipment 2 with a signal cable duct 20. The signal cable duct 20 and the bow 17 of the piece of water sports equipment 2 differ from the embodiment according to FIG. 2 in that the hull 10 comprises a thickened portion 33 or rather bulge on the upper side 12 in the region of the bow 17. The front end 22 of the signal cable duct 20 comprises a retainer 26, which grips around said thickened portion 33 and the signal cable duct 20 is secured to the hull 10 in a secure manner in this way.

Figure 5:
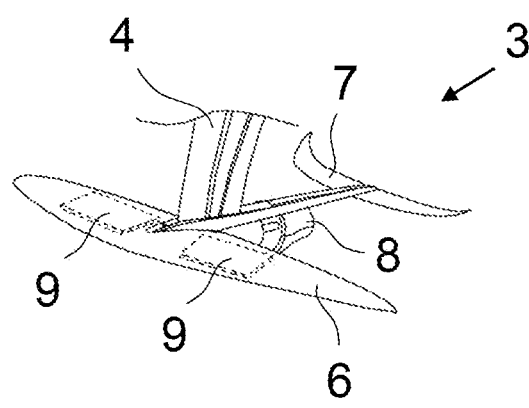
FIG. 5 is a schematic simplified perspective diagram of a hydrofoil device in which the drive, the foils, and the batteries form a structural unit.

FIG. 5 shows, in a schematically simplified manner, another embodiment of a hydrofoil device 3. Said hydrofoil device 3 differs from the embodiment according to FIG. 2 in that the drive 8 forms a structural unit together with the foils 6, 7 and the batteries 9. In particular, said structural unit is releasably secured to the support column 4 in order to simplify transportation.

Figure 6:
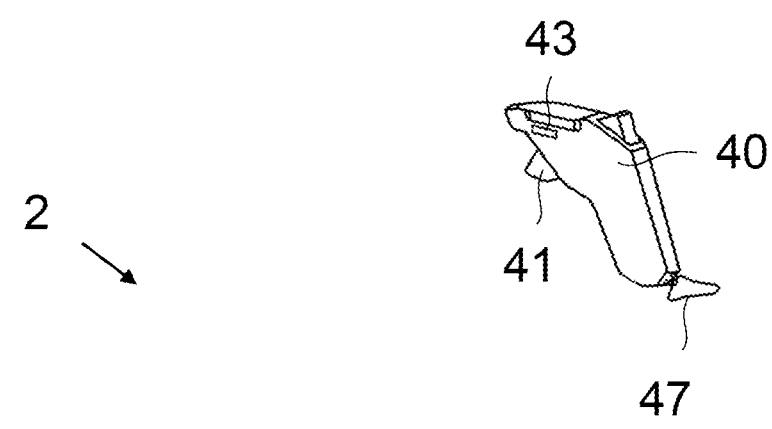
FIG. 6 is a schematic simplified perspective diagram of a bow of a piece of water sports equipment having a hydrofoil device and an emergency stop cable.
Figure 6:
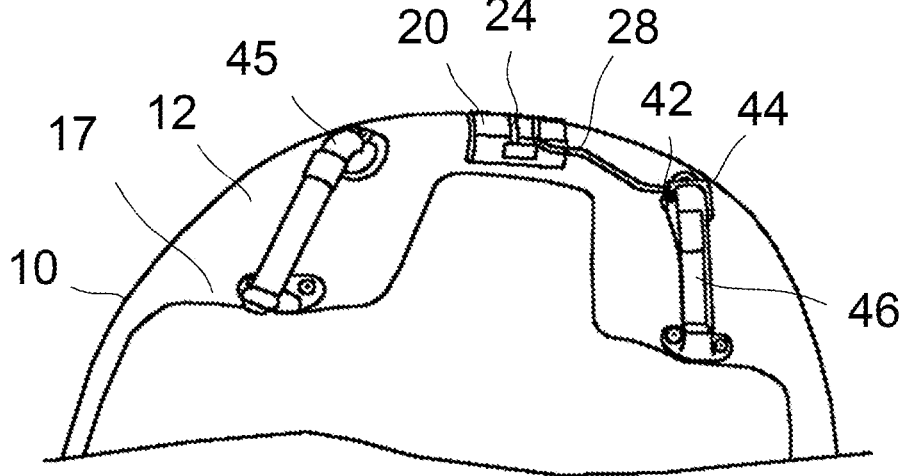

FIG. 6 shows the bow 17 of a piece of water sports equipment 2 with a signal cable duct 20 of a hydrofoil device 3. A left handle 45 and a right handle 44 are arranged on the upper side 12 of the hull 10. In addition to a signal cable 24, the signal cable duct 20 also contains an emergency stop cable 28, which is guided from the electric drive 8 to a reed switch 42, which is arranged on the handle 44. The handle 44 comprises a recess 46 for accommodating the control device 40. The control device 40 comprises a deflectable operating element 41, for example a throttle, for regulating the power of the drive 8. In addition, the remote control device 40 comprises a tether 47 for fastening the remote control device 40 to a wrist of a user. Moreover, the remote control device 40 comprises a magnet 43. Provided that the remote control device 40 is arranged in the recess 46, the magnet 43 acts on the reed switch 42, as a result of which an electric circuit is opened or closed in the reed switch 42. In this state, the drive 8 can be actuated as normal. However, if the user falls off of the piece of water sports equipment 2, the remote control device 40 is pulled by means of the tether 47 out of the recess 46, such that the magnet 43 is no longer arranged in the vicinity of the reed switch 42. As a result, the reed switch is transferred into another state, and the electric circuit is thus closed or opened. This generates an emergency stop signal which is transmitted to the electric drive 8, such that the drive 8 is switched off and the piece of water sports equipment 2 stops.

All of the indicated features, including those which are to be inferred from the drawings alone, and individual features which are disclosed in combination with other features, are deemed to be essential to the invention both alone and in combination. Embodiments according to the invention can be performed by individual features or a combination of multiple features.

REFERENCE CHARACTERS APPEARING IN
THE DRAWING FIGURES

2 Piece of water sports equipment
3 Hydrofoil device
4 Support column
5 Head end
6 Foil
7 Foil
8 Drive
9 Battery
10 Hull
12 Upper side
14 Underside
16 Front edge of the hull
17 Bow
18 Stern
20 Signal cable duct
21 Rear end
22 Front end
23 Receiving device
24 Signal cable
25 Bending edge
26 Retainer
27 Clamp

9

28 Emergency stop cable
30 Adapter
31 Bore
32 Cavity
33 Thickened portion
40 Remote control device
41 Operating element
42 Reed switch
43 Magnet
44 Handle
45 Handle
46 Recess
47 Tether
48 Hall sensor

The invention claimed is:

1. A hydrofoil device comprising:
at least one foil;
a support column;
an electric drive;
at least one battery; and
an elongate signal cable duct;
wherein a head end of the support column is configured so as to be securable to an underside of a hull of a piece of water sports equipment,
wherein the at least one foil is secured to the support column,
wherein the electric drive is secured to the support column and/or the at least one foil,
wherein the at least one battery is electrically connected to the electric drive for supplying the electric drive with electrical energy,
wherein a rear end of the signal cable duct is arranged at the support column and a front end of the signal cable duct comprises a receiving device,
wherein the receiving device is configured to receive control signals,
wherein the signal cable duct encloses at least one signal cable,
wherein the at least one signal cable is configured to transmit the control signals from the receiving device to the electric drive, and
wherein the signal cable duct is configured to grip around a front edge of the hull of the piece of water sports equipment.

2. The hydrofoil device according to claim 1, wherein the signal cable duct is configured such that the receiving device is arranged on an upper side of the hull at a bow of the piece of water sports equipment when the front end of the signal cable duct grips around the front edge of the hull.

3. The hydrofoil device according to claim 1, wherein the signal cable duct is resilient in a longitudinal direction, and wherein the signal cable duct consists of rubber or comprises rubber.

4. The hydrofoil device according to claim 1, wherein the signal cable duct consists of rubber or comprises rubber.

5. The hydrofoil device according to claim 1, wherein the signal cable duct is a flat strip.

6. The hydrofoil device according to claim 3, wherein the front end of the signal cable duct comprises at least one bending edge which extends transversely to the longitudinal direction and by means of which a clamp is formed for gripping around the front edge of the hull.

7. The hydrofoil device according to claim 2, wherein the front end of the signal cable duct comprises a retainer which is designed to be secured to the upper side of the hull.

8. The hydrofoil device according to claim 1, wherein the signal cable duct encloses an emergency stop cable in addition to the at least one signal cable.

9. The hydrofoil device according to claim 8, wherein the emergency stop cable is configured to transmit an emergency stop signal from a reed switch to the electric drive.

10. The hydrofoil device according to claim 9, wherein the hydrofoil device further comprises a magnet which is coupled to a tether and which is releasably secured to the reed switch.

11. The hydrofoil device according to claim 10, wherein the reed switch is configured to be secured to the piece of water sports equipment and to generate the emergency stop signal when the magnet is decoupled from the reed switch.

12. The hydrofoil device according to claim 1, wherein the head end of the support column comprises an adapter by means of which the hydrofoil device is securable to the underside of the piece of water sports equipment.

13. The hydrofoil device according to claim 12, wherein the adapter comprises four bores.

14. The hydrofoil device according to claim 1, wherein the electric drive is an impeller or a jet drive.

15. The hydrofoil device according to claim 1, wherein the at least one battery comprises an integrated battery which is arranged in the support column.

16. The hydrofoil device according to claim 15, wherein the support column comprises a cavity for accommodating a coolant, and wherein the integrated battery is arranged in the support column such that the integrated battery is at least partially surrounded by the coolant.

17. The hydrofoil device according to claim 1, wherein the at least one battery comprises an integrated battery which is arranged in the at least one foil.

18. The hydrofoil device according to claim 17, wherein the at least one foil comprises a front foil, wherein the integrated battery is arranged in the front foil, and wherein the electric drive is secured to the front foil such that the front foil forms a structural unit together with the integrated battery and the electric drive.

19. The hydrofoil device according to claim 1, wherein the at least one foil comprises at least one foldable foil, and wherein the at least one foldable foil is pivotable from a position lying against the support column into a position oriented orthogonally to the support column.

20. A piece of water sports equipment comprising:
a hull; and
a hydrofoil device according to claim 1;
wherein the head end of the support column of the hydrofoil device is secured to an underside of the hull, and
wherein the front end of the signal cable duct grips around the front edge of the hull.

21. The piece of water sports equipment according to claim 20, wherein the signal cable duct extends from the support column along the underside of the hull to the front edge of the hull.

* * * * *